(12) United States Patent
Bicais et al.

(10) Patent No.: US 11,477,062 B2
(45) Date of Patent: Oct. 18, 2022

(54) METHOD FOR RECEIVING A MODULATED SIGNAL, AND ASSOCIATED RECEIVER

(71) Applicant: COMMISSARIAT A L'ENERGIE ATOMIQUE ET AUX ENERGIES ALTERNATIVES, Paris (FR)

(72) Inventors: Simon Bicais, Grenoble (FR); Jean-Baptiste Dore, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 23 days.

(21) Appl. No.: 17/246,679

(22) Filed: May 2, 2021

(65) Prior Publication Data

US 2021/0344531 A1 Nov. 4, 2021

(30) Foreign Application Priority Data

May 4, 2020 (FR) ...................................... 2004383

(51) Int. Cl.
*H04L 27/06* (2006.01)
*H04L 27/00* (2006.01)

(52) U.S. Cl.
CPC .......... *H04L 27/06* (2013.01); *H04L 27/0002* (2013.01); *H04L 27/0008* (2013.01)

(58) Field of Classification Search
CPC ..... H04L 27/06; H04L 27/32; H04L 27/0002; H04L 27/0008; H04L 27/14;
(Continued)

(56) References Cited

U.S. PATENT DOCUMENTS 5,671,253 A * 9/1997 Stewart ................. H04L 1/0046
375/345
6,697,441 B1 * 2/2004 Bottomley .............. H04L 27/38
375/340
(Continued)

FOREIGN PATENT DOCUMENTS

WO 2004/001998 A1 12/2003

OTHER PUBLICATIONS

Solda, et al., "A 5Mb/s UWB-IR CMOS transceiver with a 186 pJ/b and 150 pJ/b TX/RX energy request", 2010 Proceedings of ESSCIRC, pp. 498-501, Sep. 2010.
(Continued)

*Primary Examiner* — James M Perez
(74) *Attorney, Agent, or Firm* — BakerHostetler

(57) ABSTRACT

A method for receiving a modulated signal, includes the steps of receiving a signal modulated by a pulse position modulation (PPM) or a pulse width modulation (PWM) or a pulse amplitude modulation (PAM) or an on-off keying (OOK) amplitude modulation, corresponding to the transmission of a sequence of one or more consecutive digital symbols, squaring the received signal, projecting the square of the received signal onto multiple components of an analogue signal basis in order to obtain an analogue vector of dimension equal to the number of projection components, the components of the analogue signal basis being non-constant functions, digitizing the analogue vector into a digital vector, jointly demodulating the components of the digital vector by way of a maximum likelihood algorithm in order to estimate the transmitted sequence of one or more consecutive digital symbols.

8 Claims, 5 Drawing Sheets

(58) Field of Classification Search
CPC . H04L 27/148; H04L 27/152; H04L 27/1525; H04L 27/38; H04L 27/40; H04L 27/49; H04L 27/4902
See application file for complete search history.

(56) References Cited

U.S. PATENT DOCUMENTS

| | | | | |
|---|---|---|---|---|
| 6,763,057 B1* | 7/2004 | Fullerton | ............ | H04L 25/4902 375/150 |
| 7,099,367 B2* | 8/2006 | Richards | ............ | H04B 1/7093 375/130 |
| 7,508,879 B2* | 3/2009 | Dore | ............ | H04B 1/71635 375/267 |
| 7,590,198 B2* | 9/2009 | Sanada | ............ | H04B 1/7183 370/503 |
| 8,059,710 B2* | 11/2011 | Abou Rjeily | ............ | H04L 1/0625 375/138 |
| 8,330,462 B2* | 12/2012 | Poupon | ............ | G01R 33/56341 324/309 |
| 8,693,765 B2* | 4/2014 | Mercier | ............ | G06K 9/6247 382/160 |
| 8,897,735 B2* | 11/2014 | Kim | ............ | H04B 1/525 375/150 |
| 9,031,172 B2* | 5/2015 | Dore | ............ | H04B 5/0025 714/796 |
| 9,178,727 B2* | 11/2015 | Dore | ............ | H04L 27/2654 |
| 9,413,418 B2* | 8/2016 | Bottazzi | ............ | G01S 7/40 |
| 9,444,515 B2* | 9/2016 | Khan | ............ | H04W 4/80 |
| 9,712,211 B2* | 7/2017 | Courouve | ............ | H04L 27/2278 |
| 10,439,851 B2* | 10/2019 | Novak | ............ | H01Q 3/42 |
| 11,057,123 B1* | 7/2021 | Chang | ............ | H04B 1/38 |
| 11,126,693 B2* | 9/2021 | Moukharski | ............ | H04L 27/22 |
| 11,163,393 B2* | 11/2021 | Alexandre | ............ | G01L 1/146 |
| 11,240,070 B1* | 2/2022 | Lin | ............ | H04B 1/44 |
| 2002/0130807 A1* | 9/2002 | Hall | ............ | G01S 13/04 340/552 |
| 2003/0022680 A1* | 1/2003 | Shreve | ............ | H04B 1/69 455/504 |
| 2003/0025631 A1* | 2/2003 | Kim | ............ | H04B 1/71637 342/135 |
| 2003/0030583 A1* | 2/2003 | Finn | ............ | B60R 21/013 342/72 |
| 2003/0058971 A1* | 3/2003 | Langford | ............ | G01S 3/50 375/343 |
| 2003/0076879 A1* | 4/2003 | Langford | ............ | G01S 13/0209 375/219 |
| 2003/0108133 A1* | 6/2003 | Richards | ............ | H04B 1/69 375/351 |
| 2003/0232612 A1* | 12/2003 | Richards | ............ | H04B 1/71637 455/323 |
| 2004/0136439 A1* | 7/2004 | Dewberry | ............ | H04L 25/4902 375/130 |
| 2004/0161064 A1* | 8/2004 | Brethour | ............ | H04B 1/719 375/347 |
| 2005/0089083 A1* | 4/2005 | Fisher | ............ | H04B 1/7075 375/130 |
| 2005/0232381 A1* | 10/2005 | Paquelet | ............ | H04B 1/7176 375/343 |
| 2005/0239432 A1* | 10/2005 | Wilcox | ............ | H04B 1/71637 455/313 |
| 2006/0025086 A1* | 2/2006 | Dore | ............ | H04B 1/71635 455/101 |
| 2006/0145853 A1* | 7/2006 | Richards | ............ | G06K 7/10306 340/572.1 |
| 2008/0186032 A1* | 8/2008 | Van Bezooijen | ............ | H03H 7/40 324/646 |
| 2010/0176982 A1* | 7/2010 | Lachartre | ............ | H03M 1/34 341/200 |
| 2011/0182501 A1* | 7/2011 | Mercier | ............ | G06K 9/6247 382/159 |
| 2012/0212290 A1* | 8/2012 | Hafuka | ............ | H04L 27/14 329/303 |
| 2013/0045701 A1* | 2/2013 | Beukema | ............ | H03D 3/007 455/207 |
| 2013/0049839 A1* | 2/2013 | Cheng | ............ | H03D 1/2272 327/306 |
| 2013/0258834 A1* | 10/2013 | Mihota | ............ | H04B 7/0697 370/278 |
| 2015/0063507 A1* | 3/2015 | Dore | ............ | H04L 27/2657 375/348 |
| 2017/0012676 A1* | 1/2017 | Courouve | ............ | H04L 27/2272 |
| 2017/0302381 A1* | 10/2017 | Riani | ............ | H04L 27/34 |
| 2018/0176041 A1* | 6/2018 | Yue | ............ | H04L 1/0048 |
| 2018/0227162 A1* | 8/2018 | Tokuhiro | ............ | H04L 27/06 |
| 2018/0331732 A1* | 11/2018 | Shattil | ............ | H04L 27/2647 |
| 2019/0227690 A1* | 7/2019 | Alexandre | ............ | F41J 5/056 |
| 2021/0135692 A1* | 5/2021 | de Ruijter | ............ | H04B 1/16 |
| 2021/0242894 A1* | 8/2021 | de Ruijter | ............ | H04B 1/1638 |
| 2021/0344531 A1* | 11/2021 | Bicais | ............ | H04L 27/0008 |
| 2021/0377083 A1* | 12/2021 | Bicais | ............ | G06N 3/084 |

OTHER PUBLICATIONS

Zhou, et al., "A Flexible Back-end with Optimum Threshold Estimation for OOK Based Energy Detection IR-UWB Receivers", 2011 IEEE International Conference on Ultra-Wideband (ICUWB), pp. 130-134, Sep. 2011.

\* cited by examiner (b) m = 1

METHOD FOR RECEIVING A MODULATED SIGNAL, AND ASSOCIATED RECEIVER

CROSS-REFERENCE TO RELATED APPLICATIONS

This application claims priority to foreign French patent application No. FR 2004383, filed on May 4, 2020, the disclosure of which is incorporated by reference in its entirety.

FIELD OF THE INVENTION

The invention relates to a method for receiving and demodulating an amplitude-modulated, pulse position-modulated or pulse width-modulated signal, and to an associated receiver.

The invention in particular targets the general problem of demodulating wideband and high-frequency signals, for example signals in the sub-terahertz spectrum of the order of 90 to 300 GHz. This frequency band has the advantage of being relatively underused, and thus exhibits an opportunity for the development of high-speed radio communication systems.

The applications targeted in this field relate notably to high-speed links between an access point and a core network, short-distance high-speed communications or else links between a base station and multiple users.

BACKGROUND

A first problem to be solved in this context relates to the ability of a receiver to digitize a wide frequency band. Specifically, analogue-to-digital converter technologies are limited from this standpoint, and do not allow such frequency bands to be digitized. This problem is in particular all the more true for an implementation in mobile terminals with limited resources.

A second problem to be solved relates to phase imperfections of high-frequency oscillators, which cause non-negligible phase noise in the sub-terahertz spectrum.

A first known solution for demodulating wideband signals in the sub-terahertz spectrum consists in implementing a coherent architecture by aggregating multiple frequency channels of smaller width. For example, the total frequency band is broken down into channels of 1 GHz, which are each digitized and demodulated independently.

This first solution makes it possible to adapt to the constraints of analogue-to-digital converters by reducing the sampling frequency for each channel, but exhibits the drawback of being highly sensitive to phase noise, since the frequency oscillators associated with each channel operate at a high frequency. Degradation due to phase noise requires implementing a suitable demodulation algorithm that is more complex in order to correct these imperfections.

Another solution described in American patent application US20050232381 relates to demodulating a wideband signal through projection onto an IQ basis for UWB (ultra-wideband) applications. This solution relates to localization and time-of-arrival measurement applications, and therefore does not involve demodulation. Moreover, the reception that is implemented is coherent in terms of phase, thereby still leading to degradations caused by phase noise in the frequency oscillators.

SUMMARY OF THE INVENTION

The invention proposes a method for receiving and demodulating a wideband signal that combines detecting energy and projecting the signal onto an analogue signal basis, for example a Fourier basis. The parallel projections are performed by correlating the square of the received signal with a set of analogue signals forming a projection basis.

The results of the projections are then integrated, digitized and then demodulated jointly via a maximum likelihood algorithm applied to one or more consecutive modulated symbols.

The targeted applications relate notably to the transmission of signals in sub-terahertz frequency bands.

The invention makes it possible to reduce the sampling frequency of analogue-to-digital converters due to the parallel projection onto an analogue signal basis and the joint demodulation of one or more modulated symbols. It also makes it possible to limit the impact of phase noise for very-high-frequency signals.

The proposed implementation moreover has the advantage of an asynchronous approach. The use of quadrature signals as projection basis makes it possible to relax the constraints in terms of synchronization between the transmitter and the receiver.

The invention also makes it possible to demodulate a pulsed signal with converters whose sampling frequency is lower than the frequency of the pulses of the signal.

The invention thus relates to a method for receiving a modulated signal and to a receiver for receiving such a modulated signal, as described in the claims.

BRIEF DESCRIPTION OF THE DRAWINGS

Other features and advantages of the present invention will become more apparent on reading the following description with reference to the following appended drawings.

DETAILED DESCRIPTION

Figure 1:
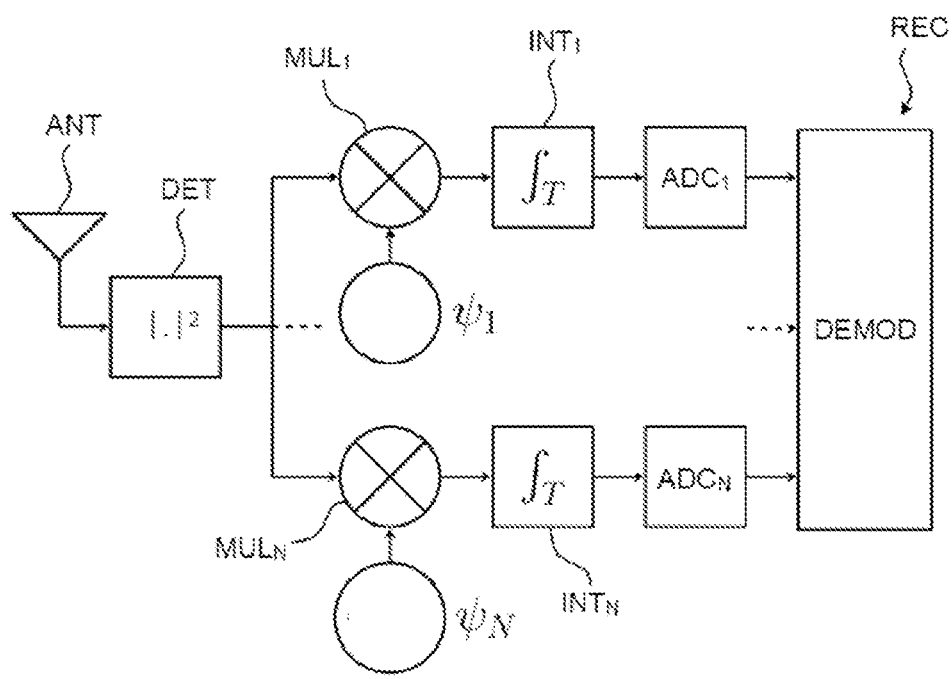
FIG. 1 shows a generic diagram of a receiver according to any one of the embodiments of the invention.

FIG. 1 shows a generic diagram of a receiver according to the invention.

The received signal is a signal modulated by an amplitude modulation, a pulse position modulation or a pulse width modulation, for example a pulse position modulation (PPM) or a pulse width modulation (PWM) or a pulse amplitude modulation (PAM) or an on-off keying (OOK) amplitude modulation.

The signal is advantageously a signal transmitted in the sub-terahertz spectrum of the order of 90 to 300 GHz.

The invention relates to a receiver for receiving such signals, and therefore the transmission device is not described in detail since it is assumed to fall within general knowledge in the field of the transmission of amplitude-modulated wideband signals.

The wideband receiver REC that is proposed comprises a reception means for receiving a wideband radiofrequency signal comprising notably one or more antennas ANT and an analogue reception chain (not shown in FIG. 1) comprising one or more analogue filters and/or one or more frequency converters.

The analogue signal that is received is then processed by a quadratic detector DET, which performs an analogue function equivalent to squaring the received signal. The quadratic detector DET is for example formed by way of a diode or an automatic mixer device.

The output signal from the quadratic detector DET is then projected, via one or more projection branches, onto an analogue signal basis $\Psi_1, \ldots \Psi_N$. This may be a Fourier basis or a Hadamard basis or any other projection basis defined by analogue signals.

The number of signals of the basis is at least equal to 1.

The projections are performed, on each branch, by an analogue multiplier $MUL_1, \ldots MUL_N$ followed by an analogue integrator $INT_1, \ldots INT_N$.

The output signal from the quadratic detector DET is thus multiplied, on each projection branch, by a function $\Psi_i(t)$ of the projection basis. When the projection basis is a Fourier basis, the function $\Psi_i(t)$ is a complex function of the type $\exp(j\varphi_i(t))$, which may be generated by way of a frequency oscillator and a phase shifter.

When the projection basis is a Hadamard basis, the function $\Psi_i(t)$ is a real function calculated from a gate function-type basis function.

Each integrator $INT_1, \ldots INT_N$ integrates the output signal from a multiplier over a duration $T_i$ equal to a multiple of the duration of a symbol $T_s$ of the modulated signal. The following is denoted: $T_i = L \cdot T_s$, where L is a strictly positive integer.

The output signals from the integrators are then digitized via analogue-to-digital converters $ADC_1, \ldots ADC_N$, which sample the signals at a sampling frequency at least equal to $Fe = 1/T_i$.

The digitized signals on the various projection branches are grouped into a vector that is produced at the input of a digital demodulator DEMOD, which jointly demodulates the components of the vector using a maximum likelihood algorithm.

The receiver REC according to the invention has multiple advantages over the techniques from the prior art.

Using a quadratic detector upstream of the receiver makes it possible to obviate the phase of the signal and thus to limit the impact of phase noise in spite of the high frequency of the carrier of the signal.

In the case of a Fourier basis, projecting the signal onto this analogue signal basis means that the frequency oscillators operate at very low frequencies in comparison with the carrier frequency of the signal, thereby furthermore making it possible to reduce the impact of phase noise. The frequencies of the oscillators are of the order of the frequency of the transmitted symbols, and may be generated reliably with negligible phase noise.

Lastly, placing the processing operations on multiple projection branches in parallel makes it possible to reduce the sampling frequency of each analogue-to-digital converter, in spite of the width of the spectrum of the received signal.

Figure 2:
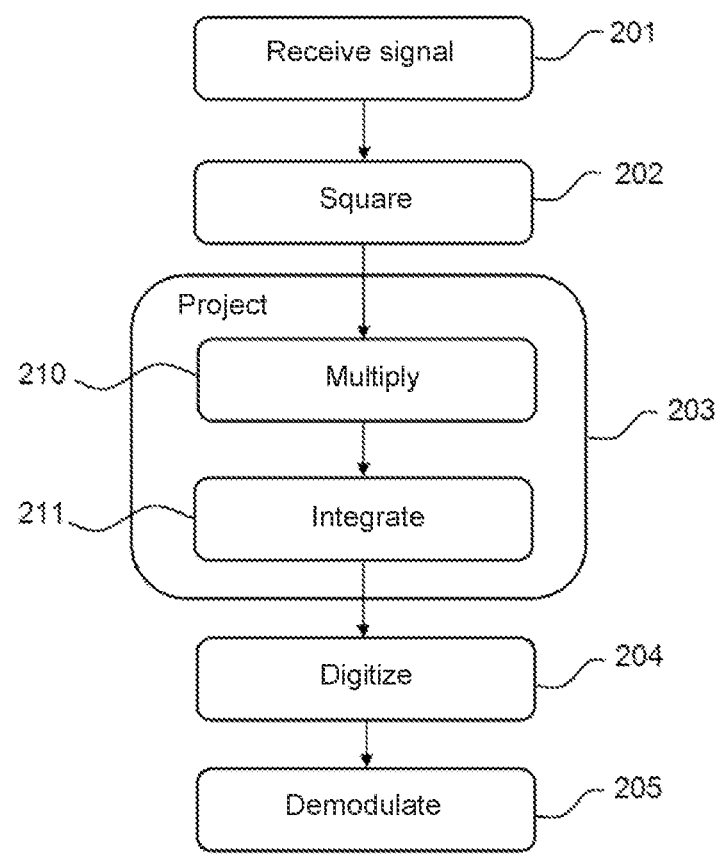
FIG. 2 shows a flowchart describing the steps of implementing the reception method according to any one of the embodiments of the invention.

FIG. 2 shows a flowchart of the steps of implementing a method for receiving a wideband signal according to the invention.

The method shown in FIG. 2 corresponds to the one executed by a receiver REC of the type in FIG. 1.

It comprises a step of receiving the signal 201, a step of squaring the signal 202, a step of projecting 203 the energy of the signal onto one or more projection branches, a step of digitizing 204 the signals projected onto each branch and a step of jointly demodulating 205 the digitized signals on each branch that are grouped into a vector. The projection step 203 comprises, for each branch, a step of multiplying 210 the square of the signal with a component of an analogue signal basis, and then a step of integrating 211 the result over an integration duration at least equal to the duration of a modulated symbol.

Figure 3:
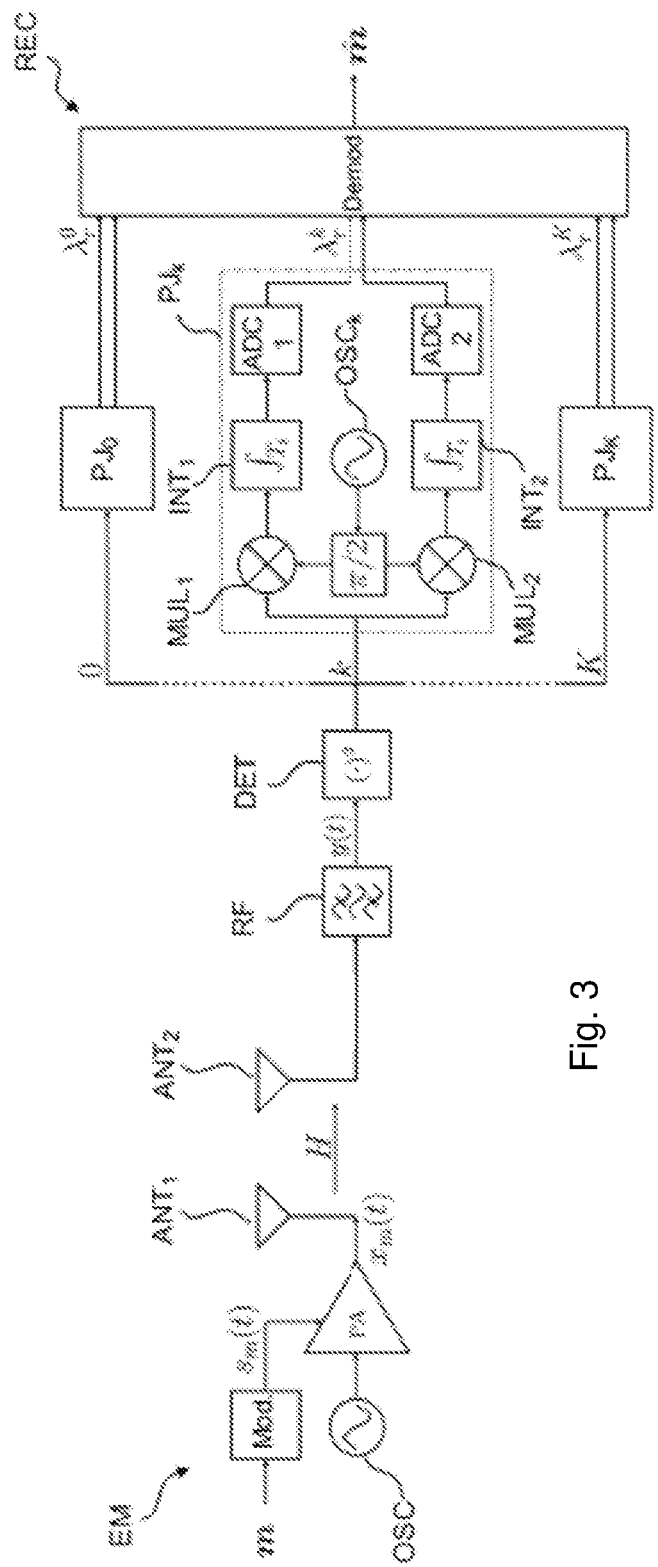
FIG. 3 shows a diagram of a receiver according to one particular embodiment of the invention using a Fourier basis.

FIG. 3 illustrates a diagram of a receiver according to one particular embodiment of the invention for which the analogue signal basis is a Fourier basis.

By way of illustration, a transmitter EM transmitting an amplitude-modulated wideband signal has been shown on the left in FIG. 3. The transmitter EM comprises an amplitude modulator MOD that converts symbols m into a modulated signal $S_m(t)$. The modulated signal is amplified and converted on the desired carrier frequency via an analogue processing chain comprising an amplifier PA and a frequency oscillator OSC. The wideband analogue signal is transmitted via a transmission means comprising at least one antenna $ANT_1$.

The receiver comprises substantially the same elements as the one in FIG. 1, specifically a radiofrequency chain RF, a quadratic detector DET, multiple projection chains $PJ_0$, $PJ_k$, $PJ_K$ and a demodulator DEMOD. The signal is projected onto a Fourier signal basis.

Each projection chain comprises a frequency oscillator $OSC_k$ for generating a signal at the frequency of a component of a Fourier basis $$e_k(t) = \exp\left(j2\pi \frac{k}{T_i} t + j\theta_k\right),$$

where $T_i$ is the integration duration of the signal and θk is a residual phase.

The signal that is obtained is multiplied by the output signal from the quadratic detector DET via two multipliers $MUL_1$, $MUL_2$ of two respective quadrature channels I, Q that are phase-offset by $\pi/2$.

Each projection chain also comprises two integrators $INT_1$, $INT_2$ with an integration duration Ti and two analogue-to-digital converters $ADC_1$, $ADC_2$ that operate at a sampling frequency at least equal to $Fe = 1/T_i$.

The complex symbols obtained at the output of each projection branch are provided, in the form of a vector $\lambda_r = [\lambda_r^0, \ldots, \lambda_r^k, \ldots, \lambda_r^K]$, to a digital demodulator DEMOD, which demodulates the signal in order to recover the transmitted symbols m.

The symbols at the input of the demodulator may be expressed by the following relationship:

$$\lambda_r = H \cdot \lambda_m + \lambda_w$$

H is the transfer function that models the propagation gain of the channel between the transmitter and the receiver, $\lambda_m$ is a complex symbol vector that depends on the information symbols m that have been transmitted and that is known to the receiver, $\lambda_w$ is a vector that models the impact of noise.

The coordinates of the vector $\lambda_r$ are expressed via the following relationship:

$$\lambda_r^k = \int_0^{T_i} y^2(t) \cdot e_k(t)^* dt$$

y(t) is the received analogue signal,
$e_k(t)$ corresponds to the signals of the projection basis.

In the same way, the vector $\lambda_m$ is expressed via the following relationship:

$$\lambda_m^k = \int_0^{T_i} x_m^2(t) \cdot e_k(t)^* dt$$

$x_m(t)$ is the modulated signal transmitted from the sequence of symbols $m=(m_1, \ldots m_L)$, where $L=T_i/T_s$ is the number of integrated symbols.

The digital demodulator DEMOD implements a demodulation algorithm based on the criterion of maximum likelihood in order to detect the transmitted vector symbol $\lambda_m$ to which the received vector symbol $\lambda_r$ is closest. All of the components of the received symbol $\lambda_r$ are thus demodulated jointly in order to recover the transmitted sequence m.

In other words, the demodulation algorithm aims to detect the most likely transmitted vector symbol $\lambda_m$. From the demodulated vector symbol $\lambda_m$, it is possible to recover the transmitted sequence of symbols m.

The relationship between each sequence of symbols m and the corresponding vector symbol $\lambda_m$ may be determined a priori, analytically or else through estimation in a prior synchronization phase during which pilot symbols known to the transmitter and to the receiver are transmitted.

The maximum likelihood criterion aims to find the sequence of symbols m̂ that maximizes the probability $p(\lambda_r|m, H)$ of having transmitted the sequence m, in the knowledge of the received vector symbol $\lambda_r$ and the transfer function of the channel H.

By construction, it is demonstrated that h is the sequence of symbols that minimizes the following expression:

$$\frac{|\lambda_r^0 - \mu_0(m)|^2}{\sigma_0^2} + \ln(\sigma_0^2(m)) + \sum_{k=1}^{K} \frac{\|\lambda_r^k - \mu_k(m)\|^2}{\sigma_k^2(m)} + 2 \cdot \ln(\sigma_k^2(m))$$

$\mu_k(m)$ and $\sigma_k^2(m)$ are respectively the mean and the variance of the distribution of the symbols $\lambda_m^k$ on each projection branch k and for each possible value of m. These statistics may be estimated using reference symbols or pilot symbols or calculated empirically from analytical calculations and from an estimate of the propagation gain of the channel H.

|·| denotes the real Euclidean distance and ‖·‖ denotes the complex Euclidean distance.

If the modulation that is used is a PPM modulation, the energy of the modulated signal does not depend on the transmitted symbol, and the maximum likelihood decision criterion is simplified. It consists in finding the sequence m̂ that minimizes the following expression:

$$\sum_{k=1}^{K} \frac{\|\lambda_r^k - H \cdot \lambda_m^k\|^2}{2N - k}$$

Where N is an integer such that $2N=B \cdot T_i+1$, B being the bandwidth of the signal.

Any optimization algorithm based on the maximum likelihood criterion applied to the above relationships may be used to implement the demodulator DEMOD.

The digital demodulator DEMOD may be produced in the form of software and/or hardware, notably using one or more processors and one or more memories. The processor may be a generic processor, a specific processor, an application-specific integrated circuit (ASIC) or a field-programmable gate array (FPGA).

Figure 4:
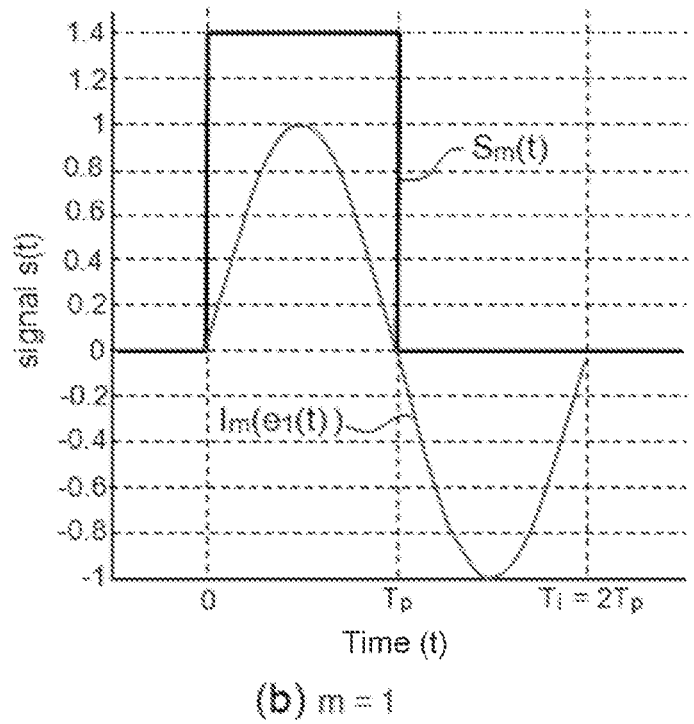
FIG. 4 illustrates one example of projecting a 2-PPM modulated symbol onto a component of a Fourier basis.
Figure 4:
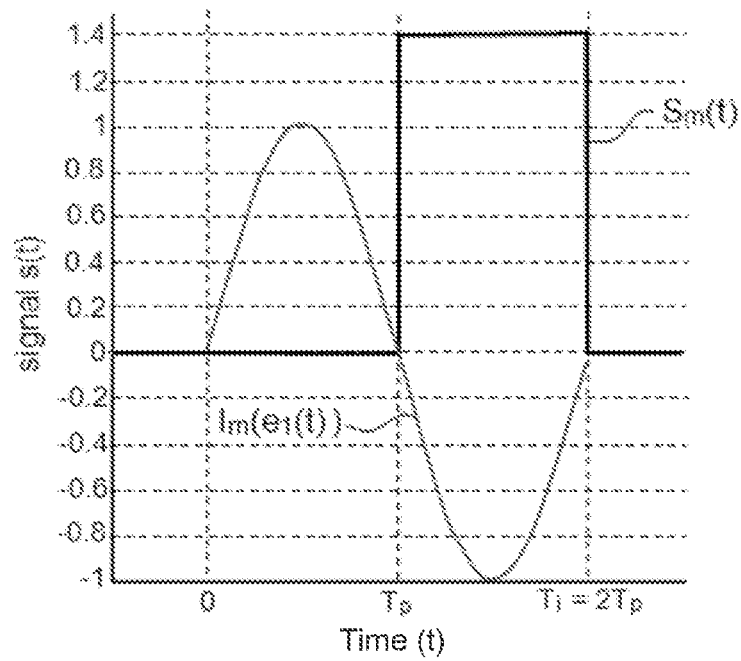

FIG. 4 shows, by way of illustration, an example of two possible values of a signal $s_m(t)$ modulated by a 2-PPM modulation and, on the same graphs, the imaginary part of the signal $e_1(t)$ of a Fourier basis.

The integration period $T_i$ in this example is equal to twice the duration of a pulse $T_p$.

The projection signal is $e_1(t)=\sin(2\pi t/T_i)$.

In a conventional PPM receiver architecture, the energy of the received signal is measured for all possible positions of the modulated pulse. The position corresponding to the maximum amount of energy is used to estimate the transmitted symbol m. PPM receivers from the prior art thus require the integration of analogue-to-digital converters at a sampling frequency $F_e=1/T_p$.

By contrast, the invention makes it possible to relax this constraint by setting an integration duration $T_i$ to a multiple of the duration of a pulse $T_p$. In the example in FIG. 4, the sampling frequency of a receiver according to the invention may therefore be reduced by a factor of 2. It may also be reduced by jointly demodulating multiple symbols.

The invention makes it possible to configure the receiver in accordance with the compromises desired for the targeted application.

In particular, three parameters of the receiver may be adjusted as needed: the sampling frequency $F_e$ of the analogue-to-digital converters, the number of projection branches K and the quantization step of the converters Q. It should be noted that the sampling frequency $F_e$ is linked directly to the integration duration $T_i$, and therefore to the number L of jointly demodulated symbols.

A high value of each of these three parameters improves the performance of the receiver in terms of bit error rate, but by contrast tightens the implementation constraints on equipment with limited resources.

Figure 5:
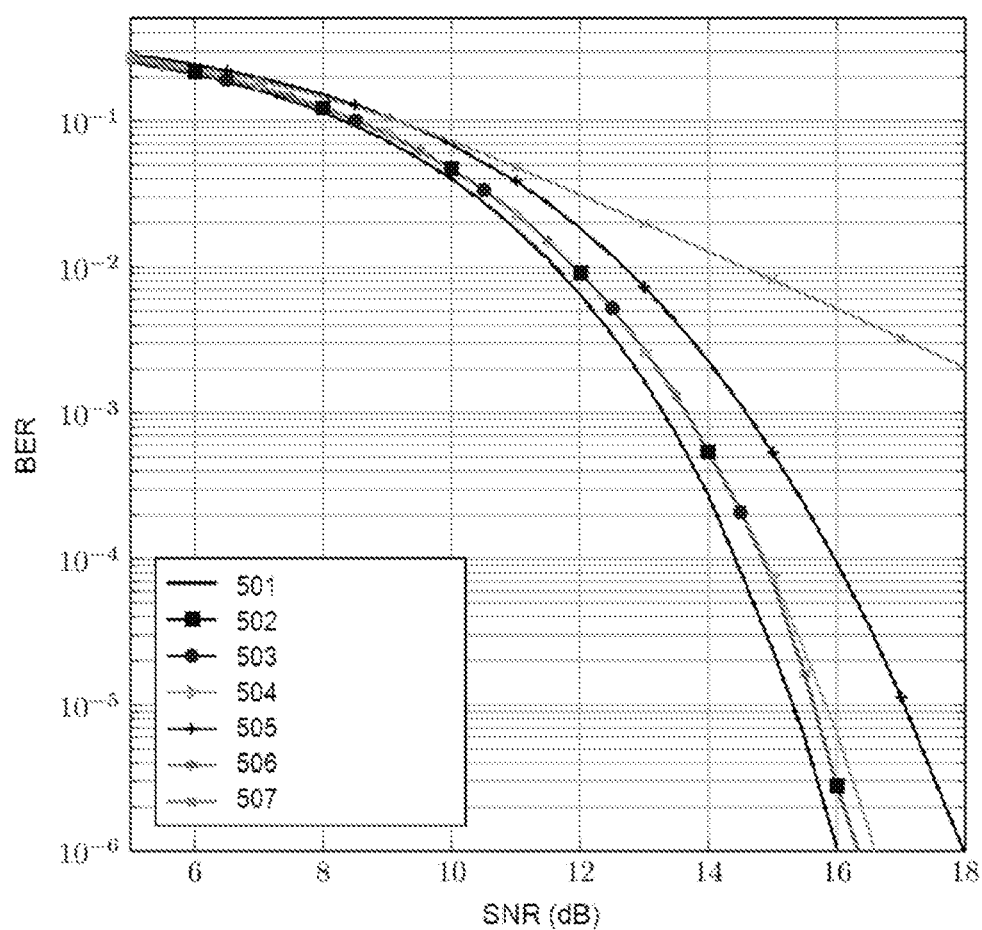
FIG. 5 shows a graph of a bit error rate as a function of a signal-to-noise ratio for various configuration parameters of the method according to the invention.

FIG. 5 illustrates the performance in terms of bit error rate (BER) as a function of the signal-to-noise ratio (SNR) obtained for various configurations of the method according to the invention.

All of the results shown in FIG. 5 are obtained with a PPM modulation of order M=2 and a bandwidth of the signal $B=8/T_p$, where $T_p$ is the duration of a pulse of the modulated signal, $T_i=M \cdot T_p$.

For each curve, different parameters for the number of jointly demodulated symbols L, the number of projection branches K and the quantization step Q are considered.

The curve 501 is obtained for L=1, K=16 and Q=$2^{16}$.
The curve 502 is obtained for L=1, K=16 and Q=$2^1$.
The curve 503 is obtained for L=1, K=1 and Q=$2^4$.
The curve 504 is obtained for L=4, K=16 and Q=$2^4$.
The curve 505 is obtained for L=4, K=4 and Q=$2^4$.
The curve 506 is obtained for L=1, K=1 and Q=$2^1$.
The curve 507 is obtained for L=4, K=16 and Q=$2^2$.

The curve 501 corresponds to the best results in terms of bit error rate, but without taking into account implementation constraints.

FIG. 5 makes it possible to see that acceptable degradations (lower than 0.5 dB) are obtained when the parameters K and/or Q are constrictive. However, the curves 505 and 507 show greater degradations in performance when the parameter L is constrictive, this directly meaning a decrease in the sampling frequency $F_e$.

These results make it possible to illustrate the possible configuration level of the method and of the receiver according to the invention for selecting the best compromises between demodulation performance and implementation constraints according to the targeted application.

The invention claimed is:

1. A method for receiving a modulated signal, comprising the steps of:
   receiving a signal modulated by a pulse position modulation (PPM) or a pulse width modulation (PWM) or a pulse amplitude modulation (PAM) or an on-off keying (OOK) amplitude modulation, corresponding to the transmission of a sequence of one or more consecutive digital symbols, squaring the received signal,
   projecting the square of the received signal onto multiple components of an analogue signal basis in order to obtain an analogue vector of dimension equal to the number of projection components, the components of the analogue signal basis being non-constant functions,
   digitizing the analogue vector into a digital vector,
   jointly demodulating the components of the digital vector by way of a maximum likelihood algorithm in order to estimate the transmitted sequence of one or more consecutive digital symbols.

2. The method for receiving an amplitude-modulated signal according to claim 1, wherein the step of projecting the square of the received signal comprises the sub-steps of:
   multiplying the square of the received signal by a component of the analogue signal basis,
   integrating the result over an integration duration equal to a multiple of the duration of a symbol of the modulated signal.

3. The method for receiving an amplitude-modulated signal according to claim 1, wherein the step of digitizing the analogue vector into a complex vector is performed at a sampling frequency at least equal to the reciprocal of the integration duration.

4. The method for receiving an amplitude-modulated signal according to claim 1, wherein the analogue signal basis is a Fourier basis, each signal of the basis being generated at a frequency that is a multiple of the reciprocal of the integration duration.

5. The method for receiving an amplitude-modulated signal according to claim 1, wherein the analogue signal basis is a Hadamard basis.

6. A receiver (REC) for receiving a signal modulated by a pulse position modulation (PPM) or a pulse width modulation (PWM) or a pulse amplitude modulation (PAM) or an on-off keying (OOK) amplitude modulation, comprising an antenna (ANT) for receiving a modulated signal, corresponding to the transmission of a sequence of one or more consecutive digital symbols, a quadratic detector (DET) for detecting the received signal, multiple projection branches ($PJ_0$, $PJ_k$, $PJ_K$) for projecting the detected energy onto multiple components of an analogue signal basis in order to generate a complex analogue projected signal, the components of the analogue signal basis being non-constant functions, at least one analogue-to-digital converter ($ADC_1$, $ADC_2$) connected at the output of each projection branch and a digital demodulator (DEMOD) configured so as to jointly demodulate the components of a digital vector formed by the outputs of each converter by way of a maximum likelihood algorithm in order to estimate the transmission sequence of one or more consecutive digital symbols.

7. The receiver according to claim 6, wherein each projection branch comprises a frequency generator (OSCk) able to generate a frequency of a component of a Fourier basis, a phase shifter, at least one analogue multiplier ($MUL_1$, $MUL_2$) for mixing the output signal from the quadratic detector (DET) with the output signal from the frequency generator, the latter being phase-offset or not phase-offset, at least one integrator ($INT_1$, $INT_2$) for integrating the output signal from the analogue multiplier over a duration equal to a multiple of the duration of a symbol of the modulation.

8. The receiver according to claim 6, wherein the sampling frequency of each analogue-to-digital converter ($ADC_1$, $ADC_2$) is at least equal to the reciprocal of the integration duration of an integrator ($INT_1$, $INT_2$).

* * * * *